US010825254B1

(12) United States Patent
Boss et al.

(10) Patent No.: US 10,825,254 B1
(45) Date of Patent: Nov. 3, 2020

(54) AUGMENTED REALITY BOOK SELECTION-ASSIST

(71) Applicant: INTERNATIONAL BUSINESS MACHINES CORPORATION, Armonk, NY (US)

(72) Inventors: Gregory J. Boss, Saginaw, MI (US); Michael Bender, Rye Brook, NY (US); Jeremy R. Fox, Georgetown, TX (US); Keerthi E K, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/426,253

(22) Filed: May 30, 2019

(51) Int. Cl.
*G06T 19/00* (2011.01)
*G06F 16/9038* (2019.01)
*G06F 16/9032* (2019.01)
*G06F 16/9035* (2019.01)
*G06N 5/02* (2006.01)

(52) U.S. Cl.
CPC ........ *G06T 19/006* (2013.01); *G06F 16/9035* (2019.01); *G06F 16/9038* (2019.01); *G06F 16/90328* (2019.01); *G06N 5/02* (2013.01)

(58) Field of Classification Search
None
See application file for complete search history.

(56) References Cited

U.S. PATENT DOCUMENTS 6,412,012 B1 * 6/2002 Bieganski ............. G06Q 30/02
709/232
8,880,536 B1 * 11/2014 Clancy .................... G06F 16/93
707/749

(Continued)

FOREIGN PATENT DOCUMENTS

CN       107167138 A    9/2017
KR    2016-0080645 A    7/2016

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

(Continued)

*Primary Examiner* — Michael J Cobb
(74) *Attorney, Agent, or Firm* — Michael A. Petrocelli, Esq.; Kevin P. Radigan, Esq.; Heslin Rothenberg Farley & Mesiti P.C.

(57) ABSTRACT

A cognitive book interface is provided which includes artificial intelligence processing to execute on a computer system and operatively couple to a display device. The cognitive book interface provides augmentation data to the display device for display to a user based on a user-request. The cognitive book interface receives the user-request, with the user-request being related to selecting a book of interest to the user within a physical book center. The cognitive book interface determines a search query from, at least in part, the user-request, and generates a response to the search query based, at least in part, on searching one or more knowledge (Continued)

databases containing book-related data for books within the physical book center. The response is provided as augmentation data for rendering on the display device for display to the user responsive to the user-request related to selecting a book of interest to the user.

16 Claims, 10 Drawing Sheets

(56) References Cited

U.S. PATENT DOCUMENTS

| | | | | |
|---|---|---|---|---|
| 9,462,175 | B2* | 10/2016 | Kim | H04N 5/23216 |
| 9,672,203 | B1* | 6/2017 | Bhar | G06F 40/211 |
| 2003/0152894 | A1* | 8/2003 | Townshend | G09B 7/04 |
| | | | | 434/178 |
| 2004/0267607 | A1* | 12/2004 | Maddux | G06Q 99/00 |
| | | | | 705/7.42 |
| 2010/0281012 | A1* | 11/2010 | Imig | G06F 16/951 |
| | | | | 707/708 |
| 2013/0044912 | A1* | 2/2013 | Kulkarni | H04N 9/3194 |
| | | | | 382/103 |
| 2013/0321390 | A1 | 12/2013 | Latta et al. | |
| 2014/0074648 | A1* | 3/2014 | Morton | G06Q 30/0631 |
| | | | | 705/26.7 |
| 2014/0236475 | A1 | 8/2014 | Venkatraman et al. | |
| 2015/0006258 | A1* | 1/2015 | Salama | G06Q 30/0206 |
| | | | | 705/7.35 |
| 2016/0063596 | A1* | 3/2016 | Landau | G06Q 30/0631 |
| | | | | 705/26.7 |
| 2016/0063993 | A1* | 3/2016 | Dolan | G06F 16/00 |
| | | | | 704/254 |
| 2016/0180602 | A1* | 6/2016 | Fuchs | A63F 13/26 |
| | | | | 463/31 |
| 2016/0196603 | A1* | 7/2016 | Perez | G06F 3/013 |
| | | | | 345/633 |
| 2016/0246384 | A1* | 8/2016 | Mullins | G06F 3/011 |
| 2018/0336415 | A1* | 11/2018 | Anorga | G06K 9/6267 |
| 2019/0179838 | A1* | 6/2019 | Kwon | G06Q 30/06 |

OTHER PUBLICATIONS

Umlauf et al., "ARLib: The Augmented Library", 1st IEEE International Workshop Augmented Reality Toolkit, Darmstadt, Germany (2002) (2 pages).

Reitmayr et al., "Location Based Applications for Mobile Augmented Reality", 4th Australasian User Interface Conference on User Interfaces 2003 (AUIC '03), vol. 18 (pp. 65-73).

Jim Hahn, "Mobile Augmented Reality Applications for Library Services", New Library World, vol. 113, Nos. 9/10 (2012) (13 pages).

Huang et al., "Get List in the Library?: An Innovative Application of Augmented Reality and Indoor Positioning Technologies", The Electronic Library, vol. 34, Issue 1 (2016) (34 pages).

Albert A. Cervera-Uribe, "The Augmented Library" An Approach for Improving Users Awareness in a Campus Library, IEEE International Symposium on Mixed and Augmented Reality Adjunct Proceedings (ISMAR-Adjunct) (2017) (pp. 15-19).

\* cited by examiner

PROVIDE A COGNITIVE BOOK INTERFACE, THE COGNITIVE BOOK INTERFACE INCLUDING ARTIFICIAL INTELLIGENCE PROCESSING TO EXECUTE ON A COMPUTER SYSTEM AND OPERATIVELY COUPLE TO A DISPLAY DEVICE, THE COGNITIVE BOOK INTERFACE PROVIDING AUGMENTATION DATA TO THE DISPLAY DEVICE FOR DISPLAY TO A USER BASED ON A USER-REQUEST, THE COGNITIVE BOOK INTERFACE: ~600

RECEIVES THE USER-REQUEST, THE USER-REQUEST BEING RELATED TO SELECTING A BOOK OF INTEREST TO THE USER WITHIN A PHYSICAL BOOK CENTER ~602

DETERMINES A SEARCH QUERY FROM, AT LEAST IN PART, THE USER-REQUEST ~604

GENERATES A RESPONSE TO THE SEARCH QUERY BASED, AT LEAST IN PART, ON SEARCHING ONE OR MORE KNOWLEDGE DATABASES CONTAINING BOOK-RELATED DATA FOR BOOKS WITHIN THE PHYSICAL BOOK CENTER ~606

PROVIDES THE RESPONSE AS AUGMENTATION DATA FOR RENDERING ON THE DISPLAY DEVICE FOR DISPLAY TO THE USER RESPONSIVE TO THE USER-REQUEST RELATED TO SELECTING A BOOK OF INTEREST TO THE USER WITHIN THE PHYSICAL BOOK CENTER ~608

WHERE THE RESPONSE INCLUDES A RESPONSE TYPE SELECTED FROM THE GROUP CONSISTING OF BOOK RATING INFORMATION AND BOOK REVIEW INFORMATION ~610

WHERE THE DISPLAY DEVICE INCLUDES AN IMAGING COMPONENT, AND THE COGNITIVE BOOK INTERFACE ~612

RECEIVES CONTEXT-RELATED DATA ASSOCIATED WITH THE USER-REQUEST, THE CONTEXT-RELATED DATA INCLUDING A BOOK IMAGE AND BEING PROVIDED, AT LEAST IN PART, VIA THE IMAGING COMPONENT ~614

WHERE DETERMINING THE SEARCH QUERY FURTHER USES THE CONTEXT-RELATED DATA ASSOCIATED WITH THE USER-REQUEST, AND THE GENERATED RESPONSE IS FOR THE IMAGED BOOK ~616

WHERE THE IMAGING COMPONENT IS WORN BY THE USER AND INCLUDES AN AUGMENTED-REALITY ASSIST INSTRUMENT SELECTED FROM THE GROUP CONSISTING OF EYEGLASSES, GOGGLES, AND A HELMET ~618

WHERE THE IMAGING COMPONENT IS PART OF A MOBILE ELECTRONIC DEVICE USED BY THE USER, THE MOBILE ELECTRONIC DEVICE BEING THE DISPLAY DEVICE ~620

FIG. 6A

WHERE THE RESPONSE TYPE IS USER-CONFIGURABLE — 622

WHERE THE RESPONSE INCLUDES IDENTIFICATION OF A BOOK OF PROBABLE INTEREST TO THE USER WITHIN THE PHYSICAL BOOK CENTER WHICH ADDRESSES A QUESTION WITHIN THE USER-REQUEST — 624

IN WHICH THE COGNITIVE BOOK INTERFACE FURTHER RECEIVES — 626 CONTEXT-RELATED DATA ASSOCIATED WITH THE USER-REQUEST, THE CONTEXT-RELATED DATA INCLUDING SKILL-LEVEL-RELATED DATA ASSOCIATED WITH THE USER-REQUEST, AND DETERMINING THE SEARCH QUERY USES THE SKILL-LEVEL-RELATED DATA ASSOCIATED WITH THE USER-REQUEST, AND GENERATING OF THE RESPONSE TO THE SEARCH QUERY IS BASED, AT LEAST IN PART, ON THE SKILL-LEVEL-RELATED DATA ASSOCIATED WITH THE USER-REQUEST

WHERE THE RESPONSE FURTHER INCLUDES IDENTIFICATION OF LOCATION OF A RELATED ANSWER IN THE BOOK TO ADDRESS THE QUESTION WITHIN THE USER-REQUEST — 628

WHERE THE DISPLAY DEVICE INCLUDES AN IMAGING COMPONENT, AND THE RESPONSE INCLUDES DATA TO HIGHLIGHT SELECTED CONTENT WITHIN THE BOOK WHEN THE IMAGING COMPONENT IMAGES THE SELECTED CONTENT, THE DATA HIGHLIGHTING THE SELECTED CONTENT BEING RESPONSIVE TO THE QUESTION WITHIN THE USER-REQUEST — 630

WHERE THE ONE OR MORE KNOWLEDGE DATABASES CONTAINING BOOK-RELATED DATA FOR BOOKS WITHIN THE PHYSICAL BOOK CENTER FURTHER INCLUDES HISTORICAL DATA, THE HISTORICAL DATA INCLUDING PRIOR USER-REQUESTS TO THE COGNITIVE BOOK INTERFACE AND RESPONSES THERETO BY THE COGNITIVE BOOK INTERFACE — 632

WHERE GENERATING THE RESPONSE TO THE SEARCH QUERY IS BASED, AT LEAST IN PART, ON MACHINE LEARNING TO PREDICT AN OPTIMAL RESPONSE TO THE USER-REQUEST BASED, AT LEAST IN PART, ON THE HISTORICAL DATA AND THE BOOK-RELATED DATA CONTAINED IN THE ONE OR MORE KNOWLEDGE DATABASES — 634

WHERE THE DETERMINING INCLUDES USING NATURAL LANGUAGE PROCESSING OF THE USER-REQUEST IN DETERMINING THE SEARCH QUERY, AND GENERATING THE RESPONSE INCLUDES USING A NEURAL NETWORK TO IDENTIFY A RELATIONSHIP BETWEEN THE SEARCH QUERY AND ONE OR MORE POTENTIAL RESPONSES OBTAINED FROM SEARCHING THE ONE OR MORE KNOWLEDGE DATABASES CONTAINING THE BOOK-RELATED DATA FOR BOOKS WITHIN THE PHYSICAL BOOK CENTER — 636

WHERE THE PHYSICAL BOOK CENTER IS A BOOK CENTER SELECTED FROM THE GROUP CONSISTING OF A LIBRARY AND A BOOKSTORE, AND THE AUGMENTATION DATA FOR RENDERING ON THE DISPLAY DEVICE IS AUGMENTED REALITY DATA FOR DISPLAY ONTO AN EXISTING IMAGE SHOWN BY THE DISPLAY DEVICE WITHIN THE PHYSICAL BOOK CENTER — 638

FIG. 6B

AUGMENTED REALITY BOOK SELECTION-ASSIST

BACKGROUND

A physical book center, such as a library or bookstore, can have a multitude of reading and listening materials, any one of which might be of interest to an individual within the book center at any given time. For instance, the book center can include a wide variety of print and audio materials, including, for instance, books, periodicals, newspapers, manuscripts, films, maps, prints, documents, microform, audio recordings (such as CDs), DVDs, eBooks, audio books, and other formats, all of which are generally referred to herein as books. Since book centers can include a great number of books encompassing a wide variety of subjects, selecting a particular book of interest, or finding a particular chapter or passage within a selected book of interest, can often be time-consuming, and even overwhelming depending, for instance, on the number of books within the book center, the skill-level of the individual relative to available books in the book center, etc.

SUMMARY

Certain shortcomings of the prior art are overcome and additional advantages are provided through the provision of a computer-implemented method which includes providing a cognitive book interface. The cognitive book interface includes artificial intelligence processing to execute on a computer system and operatively couple to a display device. The cognitive book interface, which provides augmentation data to the display device for display to a user based on a user-request, receives the user-request, with the user-request being related to selecting a book of interest to the user within a physical book center. The cognitive display interface determines a search query from, at least in part, the user-request, and generates a response to the search query based, at least in part, on searching one or more knowledge databases containing book-related data for books within the book center. The cognitive book interface provides the response as augmentation data for rendering on the display device for display to the user responsive to the user-request related to selecting a book of interest to the user within the physical book center.

Systems and computer program products relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 6A-6B depict an additional embodiment of processing, in accordance with one or more aspects of the present invention;

DETAILED DESCRIPTION

Aspects of the present invention and certain features, advantages and details thereof, are explained more fully below with reference to the non-limiting example(s) illustrated in the accompanying drawings. Descriptions of well-known materials, systems, devices, processing techniques, etc., are omitted so as to not unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application, for instance, for providing a computer-implemented, cognitive book interface to operatively couple to a display device and provide augmentation data to the display device for display, where the provided augmentation data is driven by a user-request related to selecting a book of interest to a user within a physical book center.

Note also that illustrative embodiments are described below using specific code, designs, architectures, protocols, layouts, schematics, or tools only as examples, and not by way of limitation. Furthermore, the illustrative embodiments can be described in certain instances using particular software, tools, and data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

Any advantages listed herein are only examples, and are not intended to be limiting to the illustrative embodiments. Additional or different advantages can be realized by specific illustrative embodiments. Furthermore, a particular illustrative embodiment can have some, all, or none of the advantages listed herein.

Figure 7:
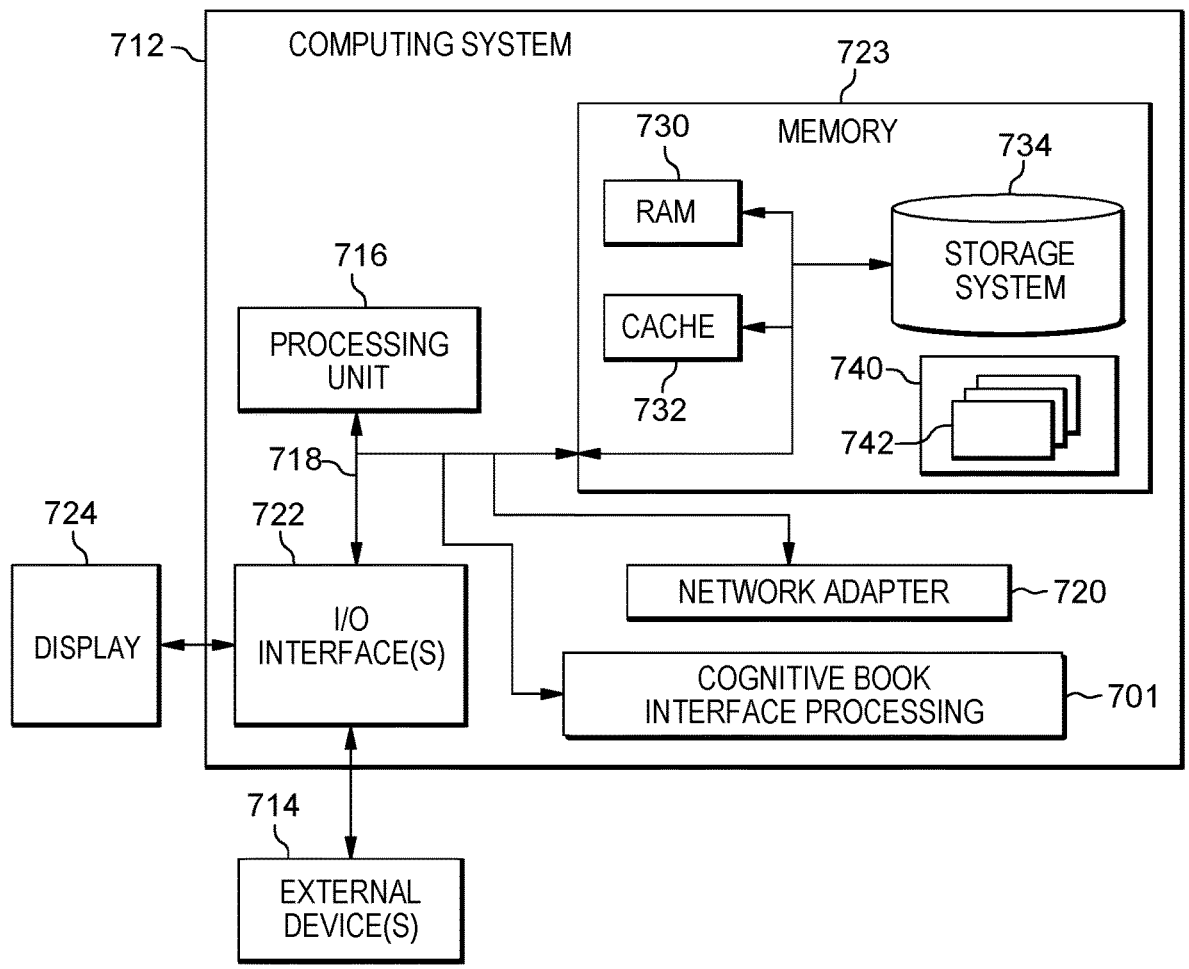
FIG. 7 depicts one embodiment of a computing system which can implement or facilitate implementing cognitive book interface processing, in accordance with one or more aspects of the present invention.

As understood by one skilled in the art, program code, as referred to in this application, can include both software and hardware. For example, program code in certain embodiments of the present invention can include fixed function hardware, while other embodiments can utilize a software-based implementation of the functionality described. Certain embodiments combine both types of program code. One example of program code, also referred to as one or more programs, is depicted in FIG. 7 as program/utility 740, having a set (at least one) of program modules 742, which can be stored in memory 723.

As noted initially, a physical book center, such as a library or bookstore, can have a multitude of reading and/or listening materials (referred to herein generally as books) on many different subjects, any one or more of which might be of interest to an individual within the book center. Based on this, selecting a particular book of interest, or locating a particular page or passage of interest within a selected book, can often be time-consuming, and even overwhelming. In view of this, disclosed herein is program code for searching via artificial intelligence processing, one or more knowledge databases containing book-related data for books within the book center, and providing a response based on the searching as augmented data using, for instance, an augmented reality (AR) device or virtual reality (VR) device. This program code with artificial intelligence processing, generally referred to herein as a cognitive book interface, is provided to beneficially assist an individual in selecting a book of interest within a book center.

Embodiments of the present invention include a computer-implemented method, a system, and a computer program product where program code executing on one or more computer systems provides a cognitive book interface which operatively couples, for instance, a user-input component, such as an audio capture device or other electronic device, and a display device, such as an augmented reality display or virtual reality display device. In one or more embodiments, the cognitive book interface includes artificial intelligence processing that provides, as augmentation data, a response to a user-request related to selecting one or more books of interest within the book center. For instance, in one or more embodiments, the response includes book rating information and/or book review information for a user-identified book within the book center. In one or more other embodiments, the response includes an identification of a selected book within the book center that addresses a question within the user-request. Further, in certain embodiments, the response can include identification of one or more pages or passages of interest within a selected book with a related or probable answer to a question within the user-request. As noted, in one or more implementations, the cognitive book interface facilitates content augmentation on a display device, such as an augmented reality device. The augmented data content is driven by a user-request made, for instance, on a user-controlled input component, such as an audio-capture device or user-electronic device, as well as by any context-related data captured at the time of, and related to, the user-request.

A cognitive book interface such as disclosed herein allows interaction of a user with (for instance) the book center's computing resource(s), such as a central server or controller within or associated with the book center or the company owning the book center, to access computer-related data that can assist the user in selecting a book of interest or locating a particular page or passage within a selected book. Using the cognitive book interface, the user controls provision of the augmentation data displayed on the display device used by the user.

In one or more implementations, the user-request is provided via a user-input component or device. For instance, the user-input component can be a mobile device, such as a mobile device owned by the individual user, or by the book center. A mobile device such as discussed herein is indicative or inclusive of various types of devices, such as a smartphone, a laptop computer, a wireless multimedia device, a tablet, a personal digital assistant, a personal computer (PC), etc. Any such mobile device can have memory for storing instructions and data, as well as hardware, software, and firmware, and combinations thereof. As is well known, a mobile device such as referenced can receive audio and/or textual input, as well as display audio and/or video data packets received over a network.

In one or more other embodiments, the user-input component is, for instance, an audio-input component, such as an audio-input component associated with a display device worn or carried by the user within the book center. In one or more embodiments, the display device is an augmented reality (AR) device or a virtual reality (VR) device, such as augmented reality glasses or a virtual reality headset, which has audio-input capability associated therewith.

In one or more implementations, the cognitive book interface includes one or more artificial intelligence processes executing on a computer system and operatively coupling the user-input component(s) and the display device. The cognitive book interface provides augmentation data for the display device for display to the user based on the user-request related to selecting a book of interest within a bookstore. In this manner, the cognitive book interface advantageously provides a search and communication capability which resolves user-input (provided via a smart or non-smart input device) and provides a generated response as augmentation data for rendering on a display device for display to the user based on the user's request. In operation, the user can obtain accurate answers to questions in the book center related to or resulting in selection of a book of interest within the book center and/or identification of a page or passage of interest within a selected book.

In one or more embodiments, an augmented reality approach is provided for displaying a response generated by the cognitive book interface, which as noted, implements one or more artificial intelligence processes to resolve user-requests based, for instance, on one or more knowledge databases with book-related data for books within the book center (as well as, in one or more embodiments, a skill level associated with the user-request). The cognitive book interface disclosed herein makes obtaining content relevant information by a user within the book center straightforward, with the desired information being obtained quickly, thereby avoiding an otherwise time-consuming search of the book center for a book of interest, or searching for information of interest within a selected book.

As discussed, the cognitive book interface identifies answers to user-requests related to selecting a book of interest to the user, and provides the responses as augmentation data for rendering on the display device for display to the user. In one example, the augmentation data includes one or more book reviews associated with a particular book being imaged through an imaging component used by user, such as an imaging component associated with the display device. For instance, in one or more embodiments, the imaging component can be a camera associated with a mobile electronic device of the user, or in one or more other embodiments, the imaging component can be an augmented-reality-assist instrument, such as, eyeglasses, contacts, goggles, or a helmet worn by the user. In this example, the image of the book is context-related data that is processed by the cognitive book interface in order to resolve and generate the response based on searching the one or more knowledge databases containing the book-related data for books within the book center.

In one or more other examples, the augmentation data includes an identification of a book of probable interest to the user within the book center which, for instance, best addresses a question within the user-request. Further, in such a case, the response can include identification of a particular page or passage within the selected book that addresses or provides the probable answer to the user-request.

Embodiments of the present invention are inextricably tied to computing, and solve an existing issue, by facilitating user-selection of a book of interest, and/or locating a page or passage within a selected book of interest, while within a physical book center, such as a library or bookstore. A cognitive book interface is provided to execute on a computer system and operatively couple to a display device, as well as to a user-input component within the book center. The cognitive book interface controls provision of augmentation data within the book center to the user via the display device based on the user-request provided via the user-input component.

Advantageously, a user, such as a book center customer or employee, can access book content-related information within the book center helpful in, for instance, recommending or selecting a book of interest, or in identifying an answer to a particular user-question within a selected book. In one or more implementations, the user-input component and the display device are different devices, such as different dedicated devices for, for instance, input of data and output display of data. In one or more other embodiments, the user-input component and the display device are part of the same electronic device, such as a user's smartphone.

Figure 1:
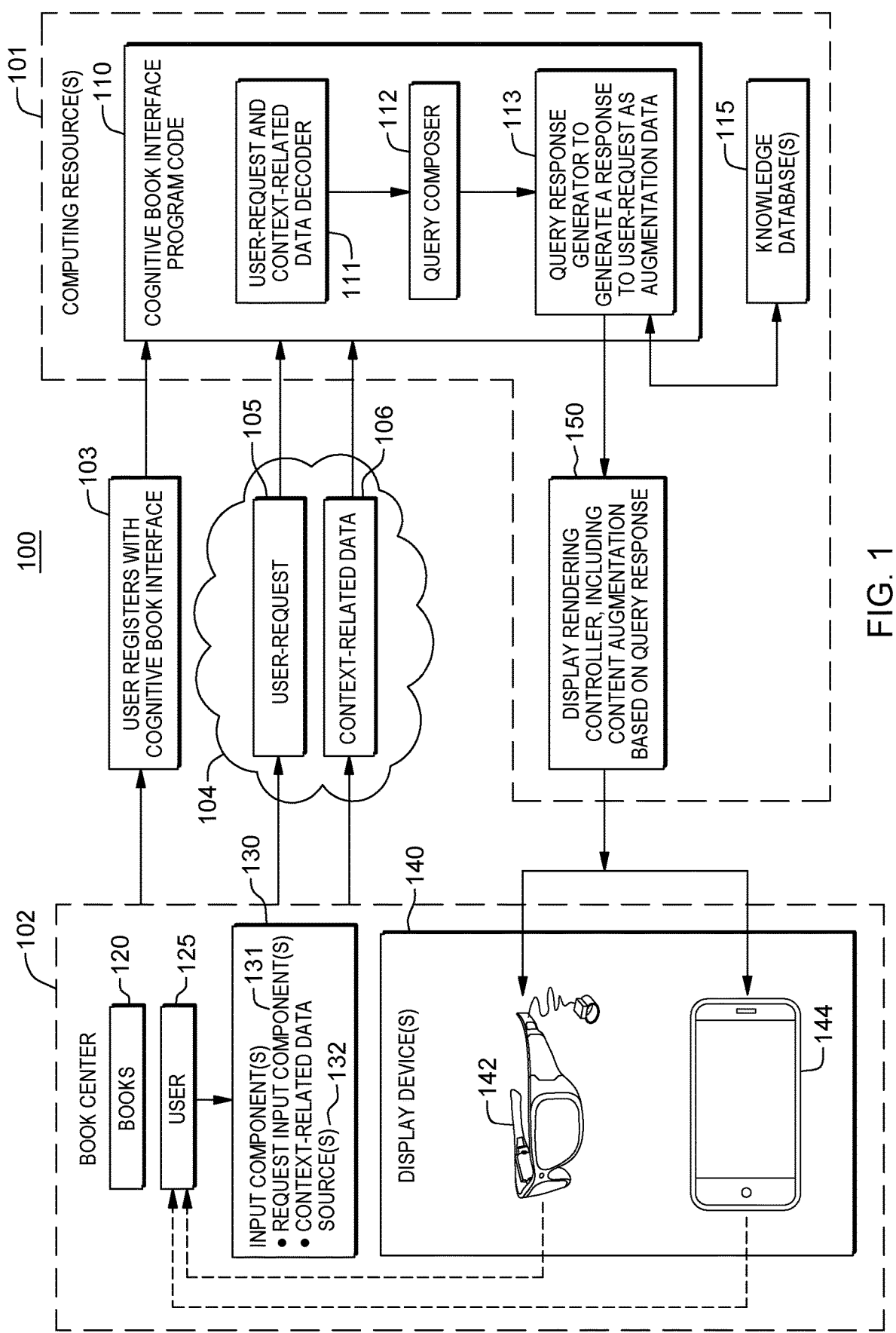
FIG. 1 depicts one embodiment of a system, in accordance with one or more aspects of the present invention.

By way of example, FIG. 1 depicts one embodiment of a system 100 incorporating, or using, various aspects of the present invention. In the embodiment illustrated, system 100 includes one or more computing resource(s) 101, a physical book center 102, and a network 104. Book center 102 is, in one or more embodiments, a public or private library, or a bookstore, which includes a larger number of books 120, as well as one or more users 125 and one or more input component(s) 130. A user 125 provides a user-request via one or more input components 130, which include (in one embodiment) one or more request input components 131, and optionally, one or more context-related data sources 132 for collecting data relevant to a user-request. Further, one or more display devices 140 are used within book center 102 by user 125, with augmented reality glasses 142 and a mobile electronic device or smartphone 144 being examples only of display device 140. In one or more embodiments, user-input component(s) 130 and display device(s) 140 can both be associated with a user 125, for instance, being worn or held by the user within book center 102.

In one or more implementations, computing resource(s) 101 houses and/or executes cognitive book interface 110 program code, in accordance with one or more aspects of the present invention. For instance, computing resource(s) 101 can be a server or other computing-system-implemented resource(s) that is, in one or more embodiments, separate from user-input component(s) 130 and display device(s) 140, or have aspects thereof integrated in whole or in part into input component(s) 130 and/or display device(s) 140. For illustrative purposes only, computing resource(s) 101 is depicted in FIG. 1 as being separate from book center 102. This is a non-limiting example of an implementation. In one or more other implementations, computing resource(s) 101 on which cognitive book interface 110 program code executes could, at least in part, be located within book center 102. For instance, computing resource(s) 101 could be a central server or controller within book center 102. In one or more other implementations, computing resource(s) 101 could be or could include cloud-based computing resources.

Briefly described, computing resource(s) 101 can include one or more processors, for instance, central processing units (CPUs). Also, the processor(s) can include functional components used in the execution of program code, such as functional components to fetch program code from locations such as cache or main memory, decode program code, and execute program code, access memory for instruction execution, and write results of the executed instructions or code. A processor can also include a register(s) to be used by one or more of the functional components. In one or more embodiments, computing resource(s) 101 can include memory, input/output, a network interface, and storage, which can include and/or access one or more knowledge databases 115. The components of computing environment 101 can be coupled to each other via one or more buses and/or other connections. Bus connections can be one or more of any of several types of bus structures, including a memory bus or a memory controller, a peripheral bus, an accelerated graphics port, and a processor or local bus, using any of a variety of bus architectures. By way of example, and not limitation, such architectures can include the industry standard architecture (ISA), the micro-channel architecture (MCA), the enhanced ISA (EISA), the video electronic standard association (VESA), local bus, and the peripheral component interconnect (PCI). Examples of computing resource(s) or computer system(s) which can implement one or more aspects disclosed herein are described further below with reference to FIGS. 7-9.

As noted, depending on the implementation, one or more aspects of computing resource(s) 101 could be associated with, licensed by, subscribed to by, etc., a company or organization operating book center 102. Further, as noted, one or more aspects of computing resource(s) 101 could be located remote from book center 102. For instance, one or more aspects of computing resource(s) 101 could be in a cloud-based environment, such as a cloud-based service. By way of example only, system 100 can include, or utilize, one or more networks 104 for, for instance, interfacing various aspects of computing resource(s) 101, as well as for interfacing user-input component(s) 130 with cognitive book interface 110, and/or cognitive book interface 110 with display device(s) 140. By way of example, network(s) 104 could be, for instance, a telecommunications network, a local area network (LAN), a wide area network (WAN), such as the Internet, or a combination thereof, and can include wired, wireless, fiber optic connections, etc. The network(s) can include one or more wired and/or wireless networks that are capable of receiving and transmitting data, including user-requests generated by the user related to selecting one or more books of interest, as well as a response to a user-request for rendering on the display device, including responsive text, image and/or video signals.

As noted, user-input component(s) 130 can be, or include, any of a variety of user-inputs, and can include one or more request input components used in combination. For instance, user-input component(s) 130 can include one or more input component(s) 131, such as audio-input components, as well as one or more context-related data sources 132, including, for instance, camera and/or video input components for imaging one or more books within the book center. Further, video and/or audio monitoring of the user within book center can be provided, in one or more embodiments. By way of example, monitoring a user within book center 102 can be performed in a variety of ways, including, via a microphone, a video camera, Internet of Things (IoT) devices, one or more mobile electronic devices, as well as monitoring or sensing technologies, including one or more monitoring devices worn or associated with the user within book center 102. In one embodiment, the user-input component(s) 130 is, or includes, a microphone to receive a user's audio request. In one or more other embodiments, the input component(s) 130 is, or includes, a mobile electronic device (e.g., a smartphone) to capture a user's audio and/or textual input request.

In one or more embodiments, a user registers, selects or otherwise opts in to the processing disclosed herein, and in particular, to the processing provided by cognitive book interface 110. For instance, in one embodiment, the user initially registers with the cognitive book interface 103. As part of this registration process, an input-component-to-display device registration can occur where, for instance, one or more of the user-input component(s) 130 to be used by a user and/or the display device(s) 140 to be used by the user are registered or related to each other for the purpose of an augmented reality, book selection-assist session within the book center. This can be advantageous where, for instance, the input component(s) 130 and display device 140 are owned by or associated with the book center, rather than the user. In one or more embodiments, after registering with cognitive book interface, the user provides a user-request 105 related to selecting one or more books of interest to the user, where the user-request 105 is provided, for instance, from within the physical book center. Further, note that in one or more embodiments, context-related data 106 can also be gathered within book center 102, via one or more data sources, and provided via network 104 to cognitive book interface 110, for instance, along with the user-request(s) 105, to assist cognitive book interface 110 in determining, where appropriate, context of a user-request.

In one or more embodiments, user-request 105 and, where provided, context-related data 106, is received by cognitive book interface 110 on computing resource(s) 101 at, for instance, a user-request and context-related data decoder 111. In one or more embodiments, the user-request can include an audio query and/or a textual query. The user-request and context-related data decoder 111 includes, or can have associated therewith, program code implementing appropriate decode logic or processes to decode the user-request, and context-related data, as will be understood by one skilled in the art. By way of example, the user could input a request such as "What is the bookstore's rating or review of this book?" In this example, the words of the user-request are parsed and decoded, with context-related data also being provided to determine the particular book that the user is inquiring about. For instance, in one or more embodiments, an image of the book being viewed by the user through an imaging component, such as a component associated with the display device (e.g., eyeglasses, or camera associated with the electronic device) is provided. Query composer 112 program code uses the decoded information, along with resolving any contextual data, to compose a search query to be resolved. By way of example, a contextual word that might need to be resolved could be "this" in the above example. The resolution can include determining location and orientation of the user at the time of providing the user-request. For instance, location and orientation of the user within the book center can be ascertained via one or more data sensors within the book center, or associated with the display device, where the display device is worn or held by the user.

As illustrated in FIG. 1, cognitive book interface 110 includes, in one or more embodiments, query response generator 113 program code to generate a response to the user-request, which can include accessing one or more knowledge databases 115 of relevant book-content-related data. For instance, the book-related data can include data for multiple books, or substantially all books, within the book center, such as a summary of the book, searchable content of the book, one or more ratings of the book, one or more reviews of the book, etc. Further, in one or more embodiments, the generated response can include, by way of example, identification data for the selected book(s) in the book center, a rating and/or review for one or more books in the book center (with the particular rating or review organization being optionally user-selectable, for instance, at time of registration with the cognitive book interface), identification or highlighting of material within a selected book with a probable answer to a question within the user-request, etc. As noted, the response can be provided as augmentation data for rendering on a display device for display to the user. The response is in reply to the user's request, which as noted, relates to selecting one or more books of interest to the user within the book center. The cognitive book interface program code discussed herein is configured to facilitate selecting the one or more books to recommend to the user, and/or providing rating or review information on one or more books of interest to the user, as well where appropriate, identifying or highlighting passages within a selected book where a probable answer is located to a question in the user-request.

In one or more embodiments, the response is provided as augmentation data for rendering on the particular display device 140 the user is using. For instance, the particular display device 140 that was registered as part of the input-component-to-display device registration with the cognitive book interface performed by the user 103. Note that, in one or more embodiments, the response as augmentation data can be data that is in addition to an existing image or data appearing on the display device 140. For instance, in the case of augmented reality glasses, the user can be viewing one or more books within the book center, with the augmented data being superimposed over the viewed book(s), for instance, on a portion of the display device. Note that a display-rendering controller 150 can be part of cognitive book interface 110, or separate from the cognitive book interface. For instance, display-rendering controller 150 can be associated with the particular display device 140, such as eyeglasses 142 or smartphone 144, or can be linked to the display device 140 via any appropriate communication link, including over the same or a different network 104 as used to communicate the user-request 105 and context-related data 106.

In some embodiments of the present invention, cognitive book interface 110 program code on computing resource(s) 101 utilizes one or more existing cognitive analysis tools or agents to decode the user input, compose the search query, and/or resolve the search query based, for instance, on the domain knowledge, as described herein. For instance, some aspects of the present invention can utilize IBM Watson® as a cognitive agent. IBM Watson® is a registered trademark of International Business Machines Corporation, Armonk, N.Y., USA. In embodiments of the present invention, one or more aspects of the cognitive display interface program code can interface with IBM Watson® application programming interfaces (APIs) to perform a cognitive analysis of the received user input, and context data, as well as to construct a search query and resolve the search query, for instance, with reference to domain knowledge, such as within the knowledge database(s). In some embodiments of the present invention, cognitive display interface program code interfaces with the application programming interfaces (APIs) that are part of a known, cognitive agent, such as the IBM Watson® application program interface (API), a product of International Business Machines Corporation.

In some embodiments of the present invention, certain of the APIs of the IBM Watson® API include a cognitive agent that includes one or more programs, including, but not limited to, natural language classifiers, Retrieve and Rank (i.e., a service available through IBM Watson® developer cloud that can surface the most relevant information from a collection of documents), concepts/visual insights, tradeoff analytics, document conversion, and/or relationship extraction. In an embodiment of the present invention, one or more programs are provided to analyze the user input obtained across various sources or databases, including one or more of a natural language classifier, Retrieve and Rank APIs, and tradeoff analytics APIs.

Further, in some embodiments of the present invention, cognitive book interface 110 can include, or utilize, one or more neural networks to analyze user input, to construct search queries, and resolve the search queries with reference to domain knowledge. Neural networks are a programming paradigm which enable a computer to learn from observational data, in this case, user input, as well as context data, and historical data. The learning can be referred to as deep learning, which is a set of techniques for learning in neural networks. Neural networks, including modular neural networks, are capable of pattern (e.g., state) recognition, with speed, accuracy, and efficiency. Modern neural networks are non-linear statistical data modeling tools. They can be used to model complex relationship between inputs and outputs, or to identify patterns (e.g., states) in data (i.e., neural networks are non-linear statistical data modeling or decision making tools). In general, cognitive display interface program code utilizing neural networks can model complex relationships between inputs and outputs and identify patterns of data. Because of the speed and efficiency of neural networks, especially when parsing multiple data sets, neural networks and deep learning provide solutions to many problems in multiple-source processing.

As noted, in one or more implementations, one or both of input component(s) 130 and display device(s) 140 can be generic devices owned by, for instance, book center 102, within which they are being used. Alternatively, either input component(s) 130 or display device(s) 140 could be owned by the user. As noted, utilizing system 100 can begin, in one or more embodiments, with a user registering 103 with the cognitive book interface 110, including identifying or registering one or more input component(s) 130 and one or more particular display device(s) 140 for the interface session, which (in one or more embodiments) can exists until terminated, for instance, until terminated by the user. Further, note that appropriate communication circuitry (not shown) is provided as part of, or in association with, input component(s) 130, display device(s) 140, and cognitive book interface 110 as needed to facilitate the communications and processing disclosed herein.

As noted, in one or more embodiments, display device(s) 140 can be, or can include, for instance, an augmented reality (AR) device or a virtual reality (VR) device, such as augmented reality glasses or a virtual reality headset, or could be a smartphone with an imaging component associated therewith, as well as appropriate augmented reality or virtual reality capabilities. As used herein, an augmented reality display device is a device where objects that reside in the real world, or other information, can be "augmented" or provided by computer-generated perceptual information, across one or more sensory modalities, including visual, auditory, haptic, etc. The overlaid sensory information can be constructive (i.e., additive to the natural environment depicted) or destructive (i.e., masking of the natural environment depicted), and can be seamlessly interwoven with the physical world depicted in the display such that it can be perceived as an immersive aspect of the real environment. In contrast, virtual reality replaces the real world environment with a simulated environment. The virtual reality environment can be similar to the real world, or disconnected. Augmented reality systems can be considered a form of virtual reality that layers virtual information over, for instance, a real world view seen through glasses or a live camera feed into a headset or onto an electronic device display. In one or more embodiments, augmented reality glasses and virtual reality headsets can consist of a head-mounted display with a small screen or lens in front of the user's field of vision.

In FIG. 1, the user drives, via user-input component(s) 130, display of content (such as augmentation data) on display device 140 via cognitive book interface 110. In one or more other implementations, the cognitive book interface 110 could be programmed to automatically provide one or more types of augmentation data to display device(s) 140 within book center 102 based on the user registering with the cognitive book interface 110. For instance, in one or more embodiments, cognitive book interface 110 could automatically provide one or more ratings and/or reviews as augmentation data to display device(s) 140 whenever the user images a book via, for instance, the display device(s) 140. In this manner, the user-request could be the user initially registering for automatic provision of rating/review summaries as augmentation data as the user moves through book center 102 and images particular books within the book center.

As noted, in one or more embodiments, user-input component(s) 130 can be separate from display device(s) 140 and not communicate data directly with the display device (s). In one or more other embodiments, user-input component(s) 130 can be integrated with display device(s) 140, such as in the case of a user smartphone 144. As noted, this and many other variations to the embodiment(s) depicted are possible, based on the description provided herein. Also, note that in one or more implementations, display-rendering controller 150 could be in communication with cognitive book interface 110 and/or display device(s) 140 via dedicated communication links or channels between components, or could be implemented across a network, such as network 104.

Figure 2:
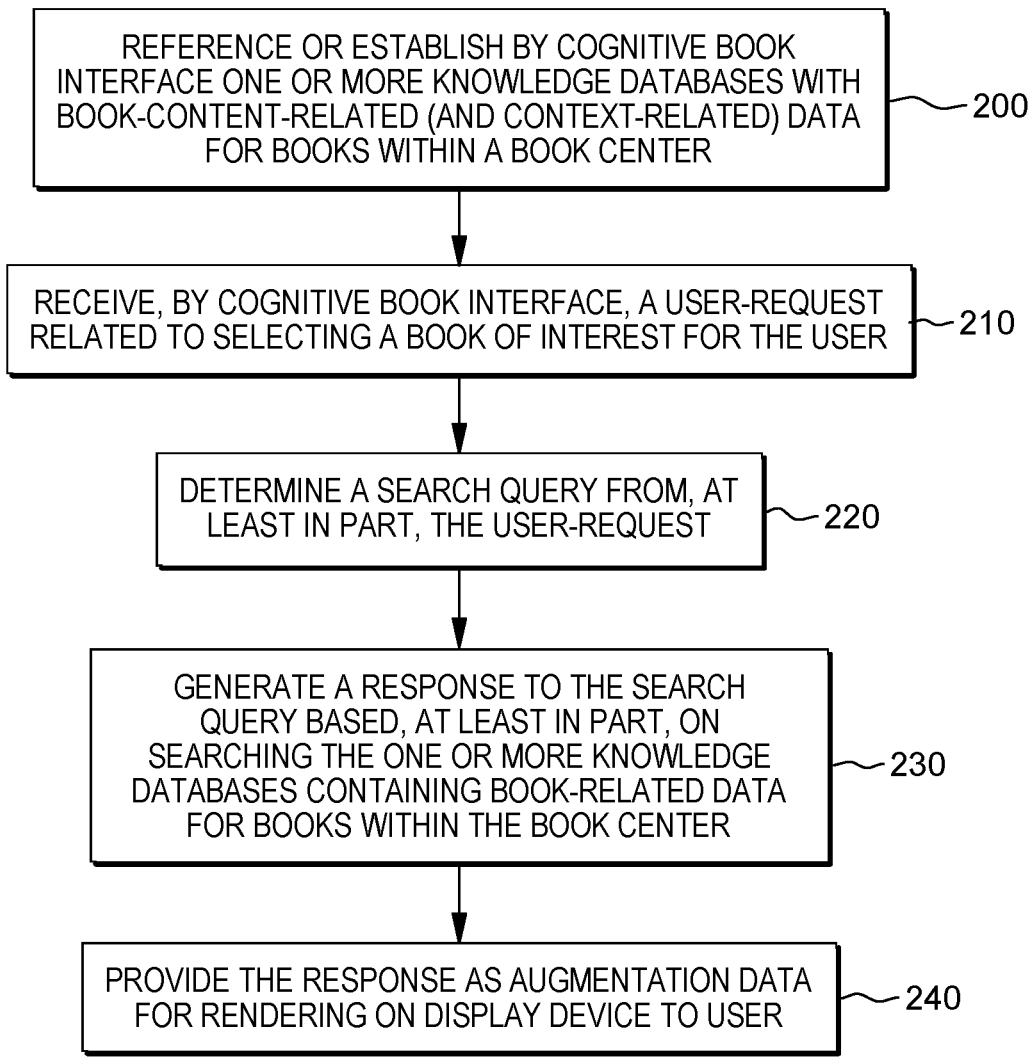
FIG. 2 depicts one embodiment of cognitive book interface processing, in accordance with one or more aspects of the present invention.

By way of further example, FIG. 2 depicts one embodiment of cognitive book interface processing, in accordance with one or more aspects of the present invention.

Initially, one or more knowledge databases with book-content-related data, and optionally context-related data, for books within a physical book center is referenced or established by the cognitive book interface 200. For instance, in the case where the cognitive book interface establishes the one or more knowledge databases, the book center can provide a list or identification of books within the book center, and the cognitive book interface can search available online sources for, for instance, a summary of one or more books within the book center, searchable content for one or more books within the book center, ratings for one or more books within the book center, reviews for one or more books within the book center, etc. In one particular implementation, the cognitive book interface references or establishes book-related data within the one or more knowledge databases for each book, or substantially all books, within the physical book center. Further, in one or more embodiments, the book-related data can include historical data, such as prior-processed user-requests, and related information. For instance, in one or more embodiments, the cognitive book interface retains user-requests, and prior-generated recommendation responses to the user-requests, within the one or more knowledge databases, including any feedback provided by the user or other users making the request(s) based on the response recommendation. For instance, the user could provide the cognitive book interface with feedback that a particular rating or review was helpful to a decision whether to, for instance, buy or read a selected book of the book center.

As noted, the interface session process can include a user registering for, or opting in to, etc., the cognitive book interface processing disclosed herein by registering with the cognitive book interface, for instance, upon entering the physical book center. Alternatively, in one or more embodiments, user registration with the cognitive book interface can be semi-permanent in that the registration can remain effective for, for instance, an extended period of time, whether the user is within the book center or not, in order that the user's registration can apply to multiple visits to the book center.

A user-request is received (for instance, from the user-input component) that is related to selecting a book of interest for the user within the book center 210. This is part of a user-query input phase where, in one or more embodiments, the user provides a user-request via the user-input component to prompt the cognitive book interface to assist the user in selecting a book based on the user-request. As noted, in one or more embodiments, the user-input component is any component capable of receiving user-input and converting the user-input into user-input data that can be transferred to, and parsed by, the cognitive book interface. For instance, in one or more implementations, the user-input component includes a microphone, and the user-request is audio-input, which is converted by, for instance, the user-input component, to an electronic signal or digital data and forwarded to the cognitive book interface for parsing.

The cognitive book interface identifies, during a query-decoding phase, any text or other data provided by the user as part of the user-request. This can include a context resolution process to resolve, where appropriate, local context of the user-input data based on, for instance, image data or other location data received from a context-related data source within the book center. The cognitive book interface, in one or more embodiments, includes a search-query composition phase, where the identified user-request, and any context data are used to compose or create a search query 220.

The cognitive book interface, using artificial intelligence processing, generates a response to the search query by referencing, for instance, the one or more knowledge databases, which as noted, are one or more searchable databases containing relevant book-related knowledge, such as book-content-related data for books within the book center 230. The process can include, in one or more embodiments, cognitively analyzing data accessible to the interface program code, for instance, across a network, such as the Internet. The cognitive book interface uses the domain knowledge obtained, along with the search query, to generate a response specific to the user-input. The response can be generated from one or more sources.

As noted, in one or more embodiments of the present invention, the cognitive book interface can utilize a cognitive analysis agent (such as IBM Watson®) to analyze relevant data and extract therefrom an appropriate response. By way of example, the response can include augmentation data to facilitate selection of a book of interest in the book center, rating and/or review data for one or more books in the book center, or locating a particular page or passage within a selected book with, for instance, an answer to a question within the user-request. In one or more embodiments, the augmentation data can include text, images, and/or video data related, and responsive, to the user-request. The response is forwarded, in one or more embodiments, as augmentation data for rendering on a display device using, for instance, existing augmented content transformation and rendering techniques implemented via the display-rendering controller (see FIG. 1), which as noted can be part of the cognitive book interface, or separate 240.

Figure 3:
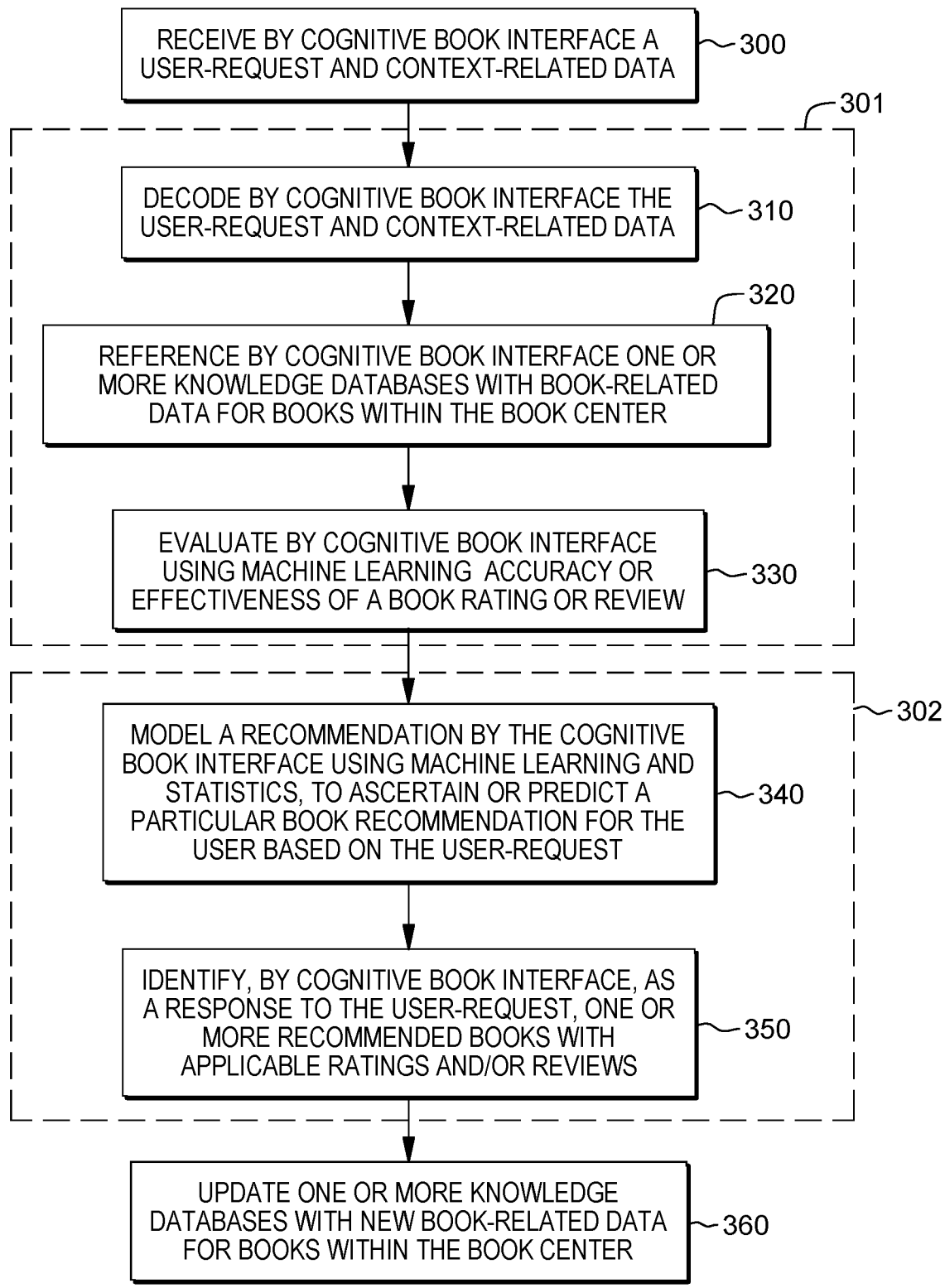
FIG. 3 depicts another embodiment of cognitive book interface processing, in accordance with one or more aspects of the present invention.

FIG. 3 depicts another embodiment of cognitive book interface program code processing, in accordance with one or more aspects of the present invention.

In one or more embodiments, the processing of FIG. 3 is preceded by, for instance, the cognitive book interface referencing or establishing one or more knowledge databases with book-related data for books within a physical book center, and by a user initiating an interface session with the cognitive book interface by registering for, or opting in to, etc., the cognitive book interface processing.

As illustrated, in one or more embodiments, the cognitive book interface processing includes receiving a user-request, and any context-related data 300. In the embodiment shown, a decode and search query phase 301 includes program code to decode by the cognitive book interface the user-request and context-related data 310, and reference by the cognitive book interface one or more knowledge databases with book-related data for books within the book center 320. As part of this, the cognitive book interface can evaluate, for instance, using machine learning, accuracy and/or effectiveness of one or more book ratings, book rating organizations, book reviews, or book review organizations 330. For instance, as part of the cognitive book interface processing, surveys on books can be collected from users, and an algorithmic approach can be used to measure the effectiveness of particular book ratings or reviews. In one or more implementations, using statistical analysis, one or more rating organizations and/or recommendation organizations can be utilized to provide an optimum rating or review to the user, where desired. Alternatively, as noted, in one or more embodiments, the user can select during the interface registration process which particular rating and/or recommendation organization the cognitive book interface processing is to use in generating responses based on a subsequent user-request of the registering user.

A response-generation phase 302 is then performed, in one or more embodiments, which includes, for instance, modeling a recommendation by the cognitive book interface using machine learning and statistics, to ascertain or predict a particular book recommendation or rating for the user based on the user-request 340. The cognitive book interface can also identify as part of the response to the user-request, one or more book selection recommendations, with applicable ratings and/or reviews 350. Further, in one or more embodiments, the one or more knowledge databases can optionally be periodically or continuously updated with new book-related data for books within the book center 360. For instance, as the book center catalog changes, the book-related information within the one or more knowledge databases can change. Further, as new or additional book-related content becomes available and searchable by the cognitive book interface, additional book-related data can be added to the one or more knowledge databases, such as when additional organizations rate and/or provide reviews for one or more books within the book center.

By way of further example, one or more knowledge databases can be established with book-related data for books within a physical book center by, for instance, searching available sources of data, such as online and offline databases, as well as collecting historical data, such as prior user-requests, and responses thereto. The cognitive book interface processing can collect surveys on books from users of the interface processing, or frequent visitors to the physical book center, as well as any online book ratings and/or book reviews for books within the book center. The cognitive book interface program code can use an algorithmic approach to measure the effectiveness of the collected ratings and reviews, and use a logistical model to predict a response of a user. As a book is imaged within the physical book center, the cognitive book interface can provide a response as augmentation data with one or more appropriate ratings and/or reviews for display to the user to assist the user. As noted, as new data and new user-requests become available, the one or more knowledge databases can be constantly updated by the cognitive book interface.

Figure 4:
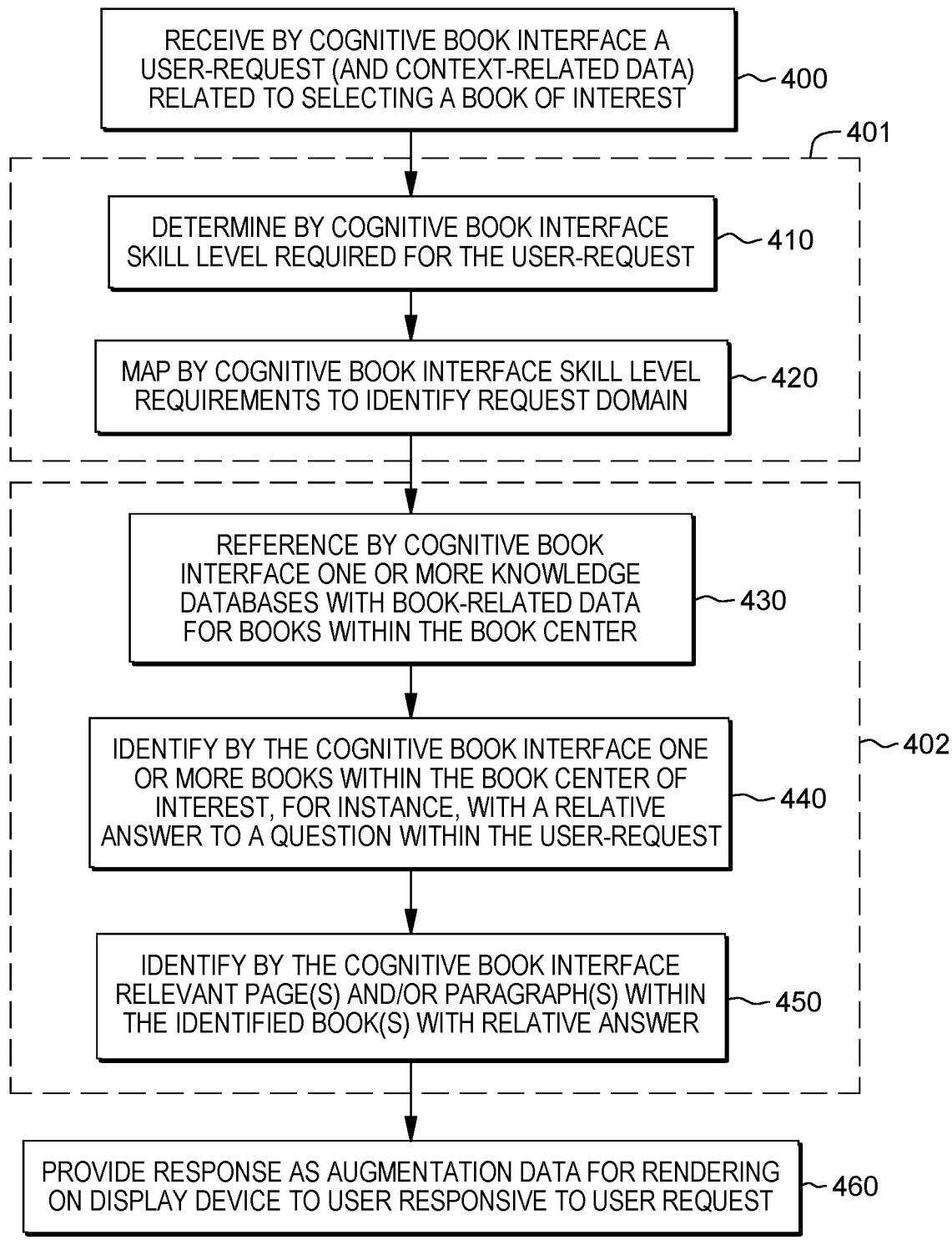
FIG. 4 depicts a further embodiment of cognitive book interface processing, in accordance with one or more aspects of the present invention.

FIG. 4 depicts another embodiment of cognitive book interface program code processing, in accordance with one or more aspects of the present invention.

In one or more embodiments, the processing of FIG. 4 is preceded by, for instance, the cognitive book interface referencing or establishing one or more knowledge databases with book-related data for books within a physical book center, and by a user initiating an interface session with the cognitive book interface by registering for, or opting in to, etc., a cognitive book interface session.

As illustrated in FIG. 4, the cognitive book interface receives a user-request, and any context-related data, related to selecting a book of interest to the user 400. By way of example, the user-request can include a question, and the cognitive book interface processing is tasked with selecting a particular book which has a probable, or best, answer to the question within the user-request.

The cognitive book interface, during a decode and search query formation phase 401, determines the skill level required for the user-request 410. For instance, the cognitive book interface can determine, based on the question of the user-request, whether the user is a novice or an expert in a field of knowledge relating to the question. The cognitive book interface maps the skill level requirements to identify a request domain 420, as part of the query search determination. Note in this regard that the request (or question) domain can then be used to facilitate selection of a particular book by the cognitive book interface.

Cognitive book interface, during a response generation phase 402, references one or more knowledge databases for book-related data for books within the book center 430, and identifies one or more books within the book center of interest, for instance, with a relative or probable answer to a question of the user-request 440. This processing can include filtering the selected one or more books based on the user's determined skill level requirements. In addition to identifying one or more books with a relative answer to the user's question, the cognitive book interface can identify relevant pages and/or passages within an identified book(s) with the relative answer 450. The response is then provided as augmentation data for rendering on the display device responsive to the user-request 460.

As a more specific example of the cognitive book interface processing to identify a selected book to address a question asked in a user-request, book data, details, applicable skills and domain knowledge can be collected through natural language processing techniques, as well as skill set identifiers, which can be used to select a best book to address the question asked. In one or more embodiments, historical book data, book details, etc., are collected into one or more knowledge databases. The skill set required for the question asked by the user is determined, for instance, by artificial intelligence processing. The skill set requirements are mapped in an automated process to identify a question domain, and knowledge of the books and the domain-specific skills required are referenced or captured relating to the question asked. The cognitive book interface processing then identifies one or more selected books which have a relative answer, for instance, using artificial intelligence processing, and where desired, identifies intent of the question, as well as a particular page or passage where the probable answer to the question is located within the selected book. The most relevant page or passage within the selected book can be identified, for instance, by highlighting the page and/or paragraph when the user's imaging component images the selected book content.

Figure 5:
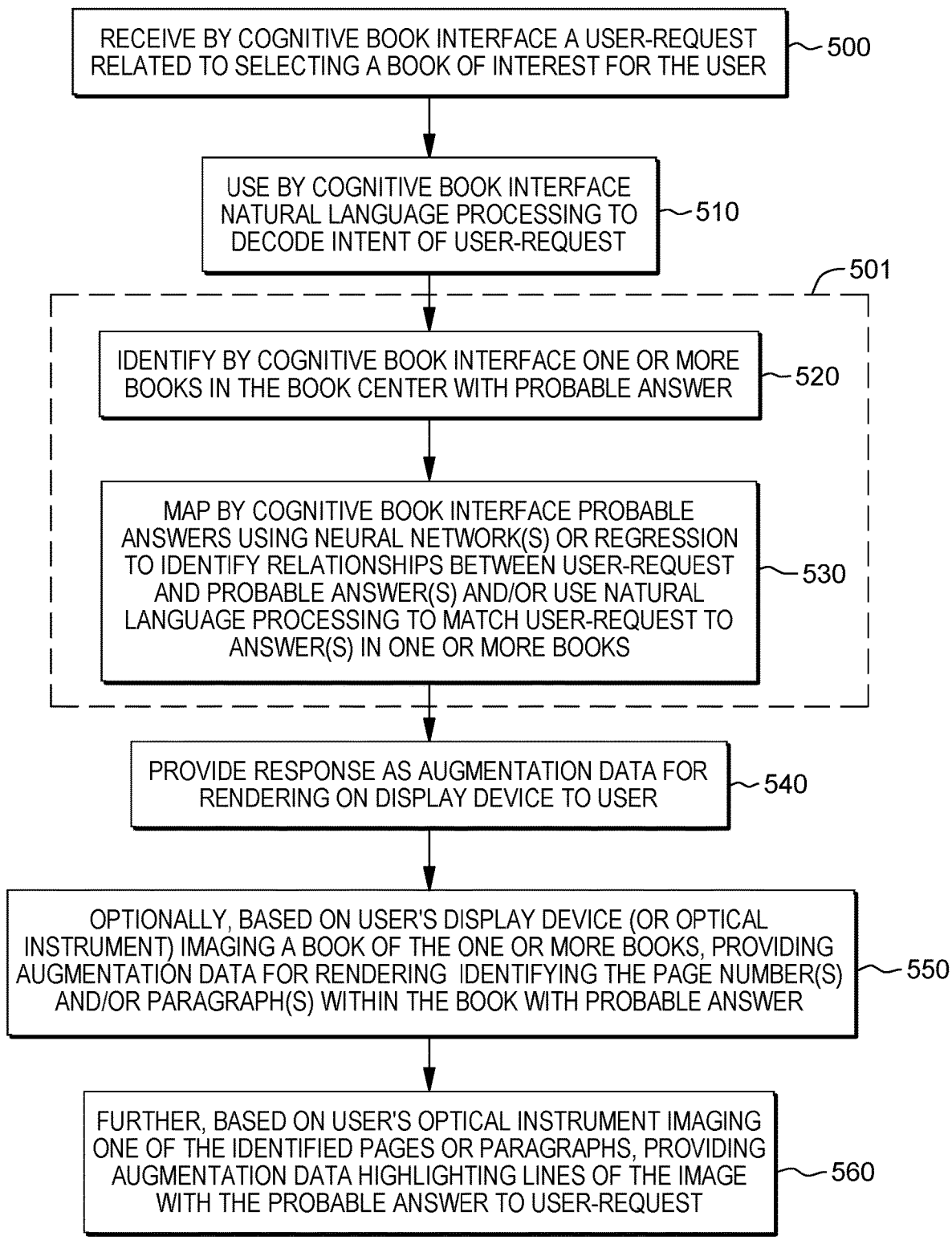
FIG. 5 depicts a still further embodiment of cognitive book interface processing, in accordance with one or more aspects of the present invention.

FIG. 5 depicts a further embodiment of cognitive book interface program code processing, in accordance with one or more aspects of the present invention.

In one or more embodiments, the processing of FIG. 5 is preceded by, for instance, the cognitive book interface referencing or establishing one or more knowledge databases with book-related data for books within a physical book center, and by a user initiating an interface session with the cognitive book interface by registering for, or opting in to, etc., a cognitive book interface session.

As illustrated in FIG. 5, the cognitive book interface receives a user-request related to selecting a book of interest for the user within a book center 500. The cognitive book interface uses natural language processing to decode intent of the user-request 510. A search query and response-generation phase 501 includes identifying by the cognitive book interface one or more books in the book center with a probable answer to a question within the user-request 520. The cognitive book interface maps the probable answers using one or more neural networks or regression processing to identify relationships between the user-request and the probable answers, and/or uses natural language processing to match the user-request to answers in one or more books 530. A response is provided as augmentation data for rendering on the display device to the user 540. Optionally, based on the user's display device (or imaging component), imaging a selected book, the augmentation data can include data to identify the page number(s) and/or passage(s) within the selected book with the probable answer 550. Further, based on the user's imaging component imaging one of the identified pages or passages, the augmentation data can highlight lines of the image with the probable answer to the user-request 560.

As a more specific example, the interface processing of FIG. 5 identifies a selected book with a probable answer to a question within the user-request, and can provide the most relevant page and/or passage location within the selected book having the probable answer. As will be understood by one skilled in the art from the description provided herein, artificial intelligence processing and statistical modeling can be used to identify the probable answer to a user's question, and to obtain the page number with the answer highlighted when imaging the appropriate content of the selected book via the user's imaging component, such as associated with the display device or the user-input component.

A user-request, or a question within the user-request, can be asked by the user using, for instance, speech-to-text processing. To understand intent of a question asked by a user, natural language processing techniques can be used to parse the user-request. An analytics technique such as segmentation can be used to identify the closest books, and/or closest portions in selected books, with probable answers. The probable answers can be mapped using one or more neural networks or regression analysis, to identify a relationship between the question and the probable answers. Alternatively, natural language processing can be used to understand the question within the user-request, and to match the intent of the question to the appropriate content of the selected book. This process identifies one or more selected books with the best probable answers. If desired, each book's rating or review information can be provided as part of the augmentation data, as well as a location of the book within the book center. With the user viewing through the imaging component one of the selected books, the particular page number or passages within the selected book with the probable answer can be provided as further augmentation data for display on the display device. Also, when the particular page or passage with the probable answer is imaged, the augmentation data can highlight the particular lines or phrases within that page or passage with the probable answer to the question of the user-request.

Further details of one or more embodiments of a method incorporating one or more aspects of the present invention are described with reference to FIGS. 6A & 6B.

Referring to FIG. 6A, in one embodiment, a cognitive book interface is provided which includes artificial intelligence processing to execute on a computer system and operatively couple to a display device. The cognitive book interface provides augmentation data to the display device for display to a user based on a user-request (600). Operatively, the cognitive book interface receives the user-request, with the user-request being related to selecting a book of interest to the user within a physical book center (602). The cognitive book interface determines a search query from, at least in part, the user-request (604), and generates a response to the search query based, at least in part, on searching one or more knowledge databases containing book-related data for books within the physical book center (606). The cognitive book interface provides the response as augmentation data for rendering on the display device for display to the user response to the user-request related to selecting a book of interest to the user within the physical book center (608).

In one or more embodiments, the response includes a response type selected from the group consisting of book-related information and book review information (610).

In one or more implementations, the display device includes an imaging component (612), and the cognitive book interface receives context-related data associated with the user-request, where the context-related data includes a book image and is provided, at least in part, via the imaging component (614). Determining the search query further uses the context-related data associated with the user-request, and the generated response is for the imaged book (616).

In one embodiment, the imaging component is worn by the user, and includes an augmented reality-assist instrument selected from the group consisting of eyeglasses, goggles, and a helmet (618). In one or more other embodiments, the imaging component is part of a mobile electronic device used by the user, with the mobile electronic device being the display device (620). As shown in FIG. 6B, in one embodiment, the response type provided by the cognitive book interface is user-configurable (622).

In one or more implementations, the response includes identification of a book of probable interest to the user within the physical book center which addresses a question within the user-request (624).

In one embodiment, the cognitive book interface receives context-related data associated with the user-request, with the context-related data including skill-level-related data associated with the user-request, and uses the skill-level-related data associated with the user-request in determining the search query, and generating of the response to the search query is based, at least in part, on the skill-level-related data associated with the user-request (626).

In one or more embodiments, the response further includes identification of location of a related answer in the book to address the question within the user-request (628). Where the display device includes an imaging component, the response can include data highlighting selected content within the book when the imaging component images the selected content, where the data highlighting the selected content is responsive to the question within the user-request (630).

In one implementation, the one or more knowledge databases containing book-related data for books within the physical book center can further include historical data, with the historical data including prior user-requests to the cognitive book interface, and responses thereto by the cognitive book interface (632). In this manner, generating the response to the search query can be based, at least in part, on machine learning to predict an optimal response to the user-request based, at least in part on, the historical data, and based on the book-related data contained in the one or more knowledge databases (634).

In one or more implementations, determining the search query can include using natural language processing of the user-request in determining the search query, and generating the response can include using a neural network to identify a relationship between the search query and one or more potential responses obtained from searching the one or more knowledge databases containing the book-related data for books within the physical book center (636).

In one implementation, the physical book center is a book center selected from the group consisting of a library and a bookstore, and the augmentation data for rendering on the display device is augmented reality data for display onto an existing image shown by the display device within the physical book center (638).

Further exemplary embodiments of a computing environment to implement one or more aspects of the present invention are described below with reference to FIGS. 7-9.

By way of further example, FIG. 7 depicts one embodiment of a computing environment 700, which includes a computing system 712. Examples of well-known computing systems, environments, and/or configurations that may be suitable for use with computer system 712 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 712 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 7, computing system 712, is shown in the form of a general-purpose computing device. The components of computing system 712 can include, but are not limited to, one or more processors or processing units 716, a system memory 723, and a bus 718 that couples various system components including system memory 723 to processor 716.

In one embodiment, processor 716 can be based on the z/Architecture® offered by International Business Machines Corporation, or other architectures offered by International Business Machines Corporation or other companies.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 712 can include a variety of computer system readable media. Such media may be any available media that is accessible by computing system 712, and it includes both volatile and non-volatile media, removable and non-removable media.

System memory 723 can include computer system readable media in the form of volatile memory, such as random access memory (RAM) 730 and/or cache memory 732. Computing system 712 can further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 718 by one or more data media interfaces. As described below, memory 723 can include at least one program product having a set (e.g., at least one) of program modules or code that are configured to carry out the functions of embodiments of the invention.

Program/utility 740, having a set (at least one) of program modules 742, can be stored in memory 732 by way of example, and not limitation, as well as an operating system, one or more application programs, other program modules, and program data. Each of the operating system, one or more application programs, other program modules, and program data or some combination thereof, can include an implementation of a networking environment. Program modules 742 generally carry out the functions and/or methodologies of embodiments of the invention as described herein. Alternatively, a cognitive book interface processing module, logic, etc., 701 can be provided within computing environment 712.

Computing system 712 can also communicate with one or more external devices 714 such as a keyboard, a pointing device, a display 724, etc.; one or more devices that enable a user to interact with computing system 712; and/or any devices (e.g., network card, modem, etc.) that enable computing system 712 to communicate with one or more other computing devices. Such communication can occur via Input/Output (I/O) interfaces 722. Still yet, computing system 712 can communicate with one or more networks such as a local area network (LAN), a general wide area network (WAN), and/or a public network (e.g., the Internet) via network adapter 720. As depicted, network adapter 720 communicates with the other components of computing system, 712, via bus 718. It should be understood that although not shown, other hardware and/or software components could be used in conjunction with computing system 712. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 7. Computer system/server 712 of FIG. 7 can be practiced in distributed cloud computing environments where tasks are performed by remote processing devices that are linked through a communications network. In a distributed cloud computing environment, program modules may be located in both local and remote computer system storage media including memory storage devices. Computer system/server 712 is capable of being implemented and/or performing any of the functionality set forth hereinabove.

Figure 8:
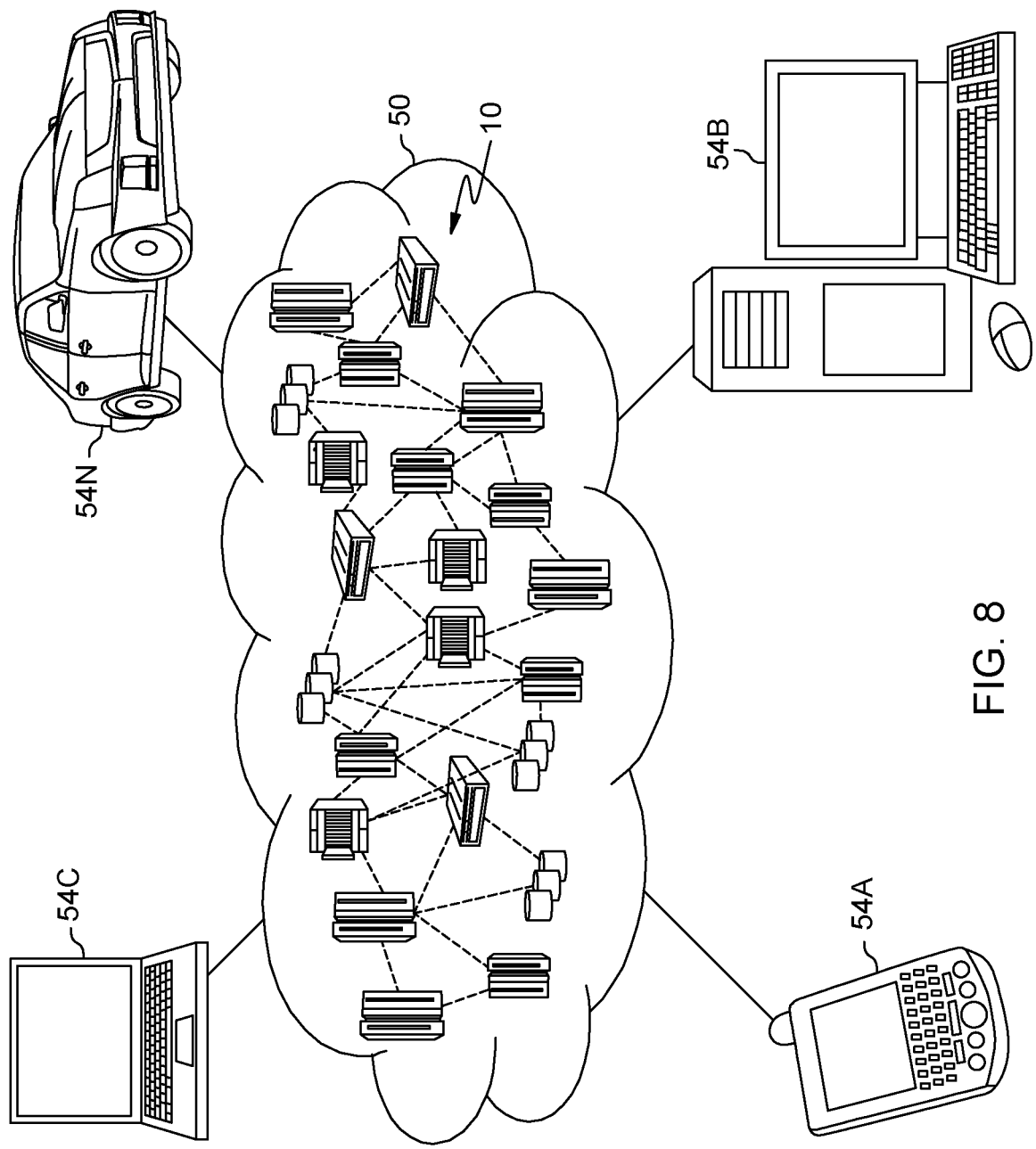
FIG. 8 depicts one embodiment of a cloud computing environment which can facilitate implementing, or be used in association with, one or more aspects of the present invention.

Referring now to FIG. 8, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 9:
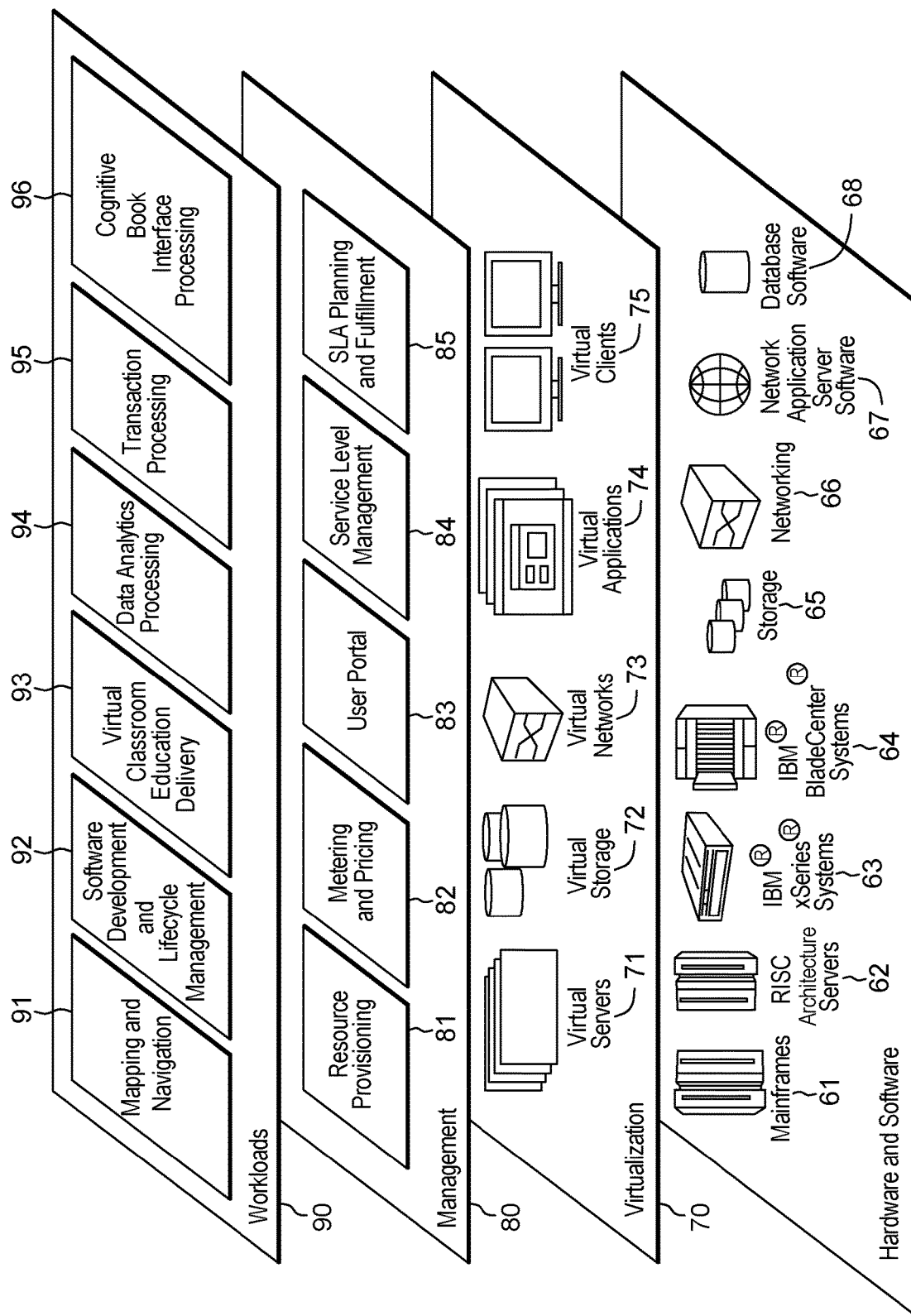
FIG. 9 depicts an example of abstraction model layers, which can facilitate implementing cognitive book interface processing, in accordance with one or more aspects of the present invention.

Referring to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91;

software development and lifecycle management 92; virtual classroom education delivery 93; data analytics processing 94; transaction processing 95; and cognitive book interface processing 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method comprising:
providing a cognitive book interface, the cognitive book interface including artificial intelligence processing to execute on a computer system and operatively couple to a display device, the cognitive book interface providing augmentation data to the display device for display to a user based on a user-request, the cognitive book interface:
receiving the user-request, the user-request being related to selecting a book of interest to the user within a physical book center, and the user-request including a question;
determining a search query from, at least in part, the user-request;
generating a response to the search query based, at least in part, on searching one or more knowledge databases containing book-related data for books within the physical book center, wherein the response includes identification of a book of probable interest to the user within the physical book center which addresses the question within the user-request, and the response further includes identification of location of an answer in the book to address the question within the user-request; and
providing the response as augmentation data for rendering on the display device for display to the user responsive to the user-request related to selecting a book of interest to the user within the physical book center with the answer to the question in the user-request.

2. The computer-implemented method of claim 1, wherein the response comprises a response type selected from the group consisting of book rating information and book review information for the book of probable interest to the user within the physical book center.

3. The computer-implemented method of claim 2, wherein the display device comprises an imaging component, and the method further comprises:
receiving context-related data associated with the user-request, the context-related data including an imaged book and being provided, at least in part, via the imaging component; and
wherein determining the search query further uses the context-related data associated with the user-request, and the generated response is for the imaged book.

4. The computer-implemented method of claim 3, wherein the imaging component is worn by the user and comprises an augmented-reality assist instrument selected from the group consisting of eyeglasses, goggles, and a helmet.

5. The computer-implemented method of claim 3, wherein the imaging component is part of a mobile electronic device used by the user, the mobile electronic device being the display device.

6. The computer-implemented method of claim 3, wherein the response type is user-configurable.

7. The computer-implemented method of claim 1, further comprising receiving context-related data associated with the user-request, the context-related data including skill-level-related data associated with the user-request, and wherein determining the search query further uses the skill-level-related data associated with the user-request, and the generating of the response to the search query is based, at least in part, on the skill-level-related data associated with the user-request.

8. The computer-implemented method of claim 1, wherein the display device comprises an imaging component, and wherein the response includes highlighting selected content within the book when the imaging component images a page of the book containing the selected content, the selected content containing the answer to the question within the user-request.

9. The computer-implemented method of claim 1, wherein the one or more knowledge databases containing book-related data for books within the physical book center further include historical data, the historical data including prior user-requests to the cognitive book interface and responses thereto by the cognitive book interface.

10. The computer-implemented method of claim 9, wherein generating the response to the search query is based, at least in part, on machine learning to predict the response to the user-request as machine-learned output based, at least in part, on the historical data and the book-related data contained in the one or more knowledge databases.

11. The computer-implemented method of claim 1, wherein the determining comprises using natural language processing of the user-request in determining the search query, and wherein generating the response includes using a neural network to identify a relationship between the search query and one or more potential responses obtained from searching the one or more knowledge databases containing the book-related data for books within the physical book center.

12. The computer-implemented method of claim 1, wherein the physical book center is a book center selected from the group consisting of a library and a bookstore, and wherein the augmentation data for rendering on the display device is augmented reality data for display onto an existing image shown by the display device within the physical book center.

13. A system comprising:
a memory; and
a processor in communication with the memory, wherein the system is configured to perform a method comprising:
providing a cognitive book interface, the cognitive book interface including artificial intelligence processing to execute on a computer system and operatively couple to a display device, the cognitive book interface providing augmentation data to the display device for display to a user based on a user-request, the cognitive book interface:
receiving the user-request, the user-request being related to selecting a book of interest to the user within a physical book center, and the user-request including a question;
determining a search query from, at least in part, the user-request;
generating a response to the search query based, at least in part, on searching one or more knowledge databases containing book-related data for books within the physical book center, wherein the response includes identification of a book of probable interest to the user within the physical book center which addresses the question within the user-request, and the response further includes identification of location of an answer in the book to address the question within the user-request; and
providing the response as augmentation data for rendering on the display device for display to the user responsive to the user-request related to selecting a book of interest to the user within the physical book center with the answer to the question in the user-request.

14. The system of claim 13, wherein the response also comprises a response type selected from the group consisting of book rating information and book review information for the book of probable interest to the user within the physical book center.

15. The system of claim 13, wherein the determining comprises using natural language processing of the user-request in determining the search query, and wherein generating the response includes using a neural network to identify a relationship between the search query and one or more potential responses obtained from searching the one or more knowledge databases containing the book-related data for books within the physical book center.

16. A computer program product comprising:
a computer-readable storage medium having computer-readable program code embodied therewith, the computer-readable program code when executed by a processor performing a method comprising:
providing a cognitive book interface, the cognitive book interface including artificial intelligence processing to execute on a computer system and operatively couple to a display device, the cognitive book interface providing augmentation data to the display device for display to a user based on a user-request, the cognitive book interface:

receiving the user-request, the user-request being related to selecting a book of interest to the user within a physical book center, and the user-request including a question;

determining a search query from, at least in part, the user-request;

generating a response to the search query based, at least in part, on searching one or more knowledge databases containing book-related data for books within the physical book center, wherein the response includes identification of a book of probable interest to the user within the physical book center which addresses the question within the user-request, and the response further includes identification of location of an answer in the book to address the question within the user-request; and providing the response as augmentation data for rendering on the display device for display to the user responsive to the user-request related to selecting a book of interest to the user within the physical book center with the answer to the question in the user-request.

\* \* \* \* \*